C. H. PRATT.
MONOWHEEL DRIVE MECHANISM.
APPLICATION FILED AUG. 16, 1918.
1,310,542.
Patented July 22, 1919.
3 SHEETS—SHEET 3.
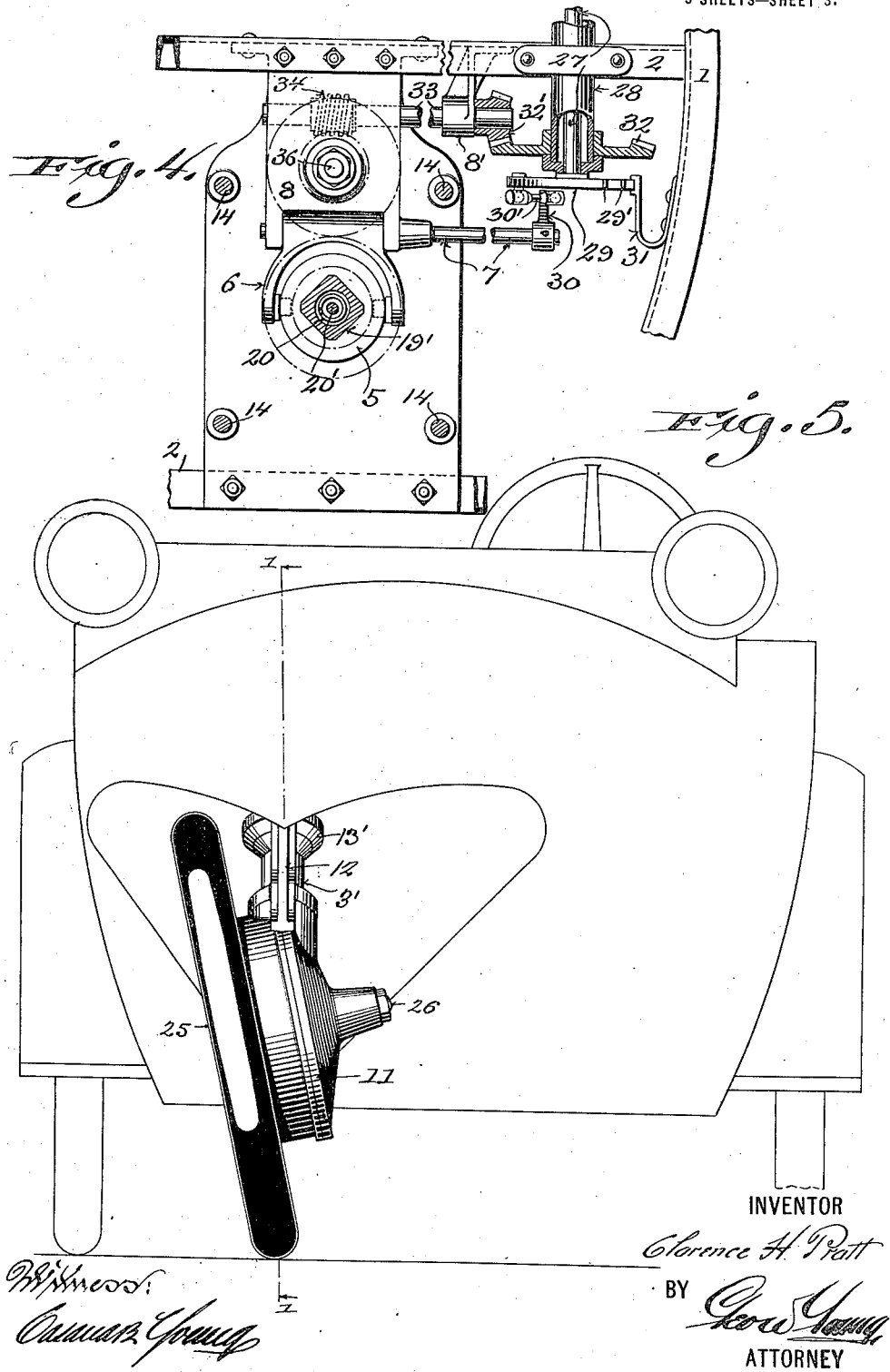
INVENTOR
Clarence H. Pratt
BY
ATTORNEY

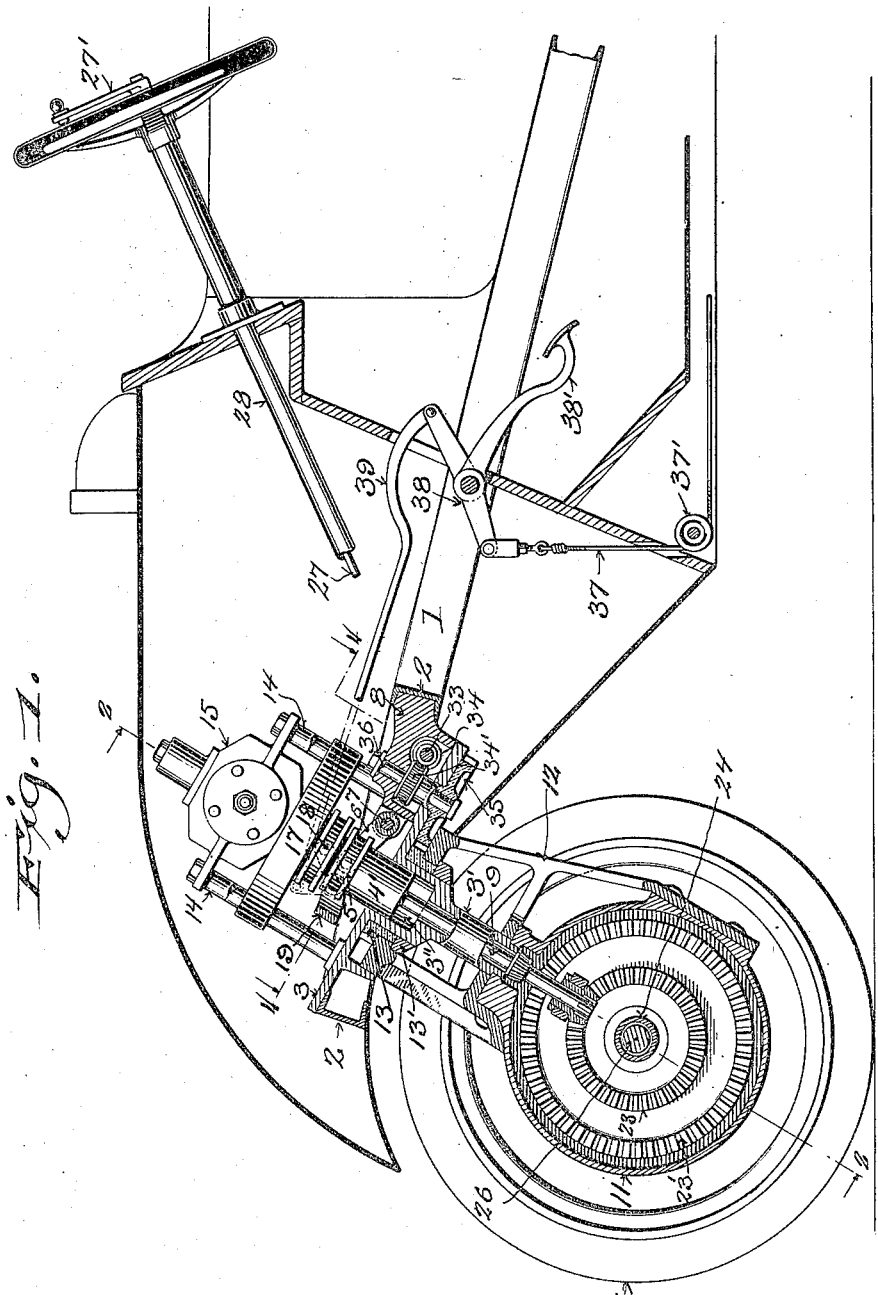

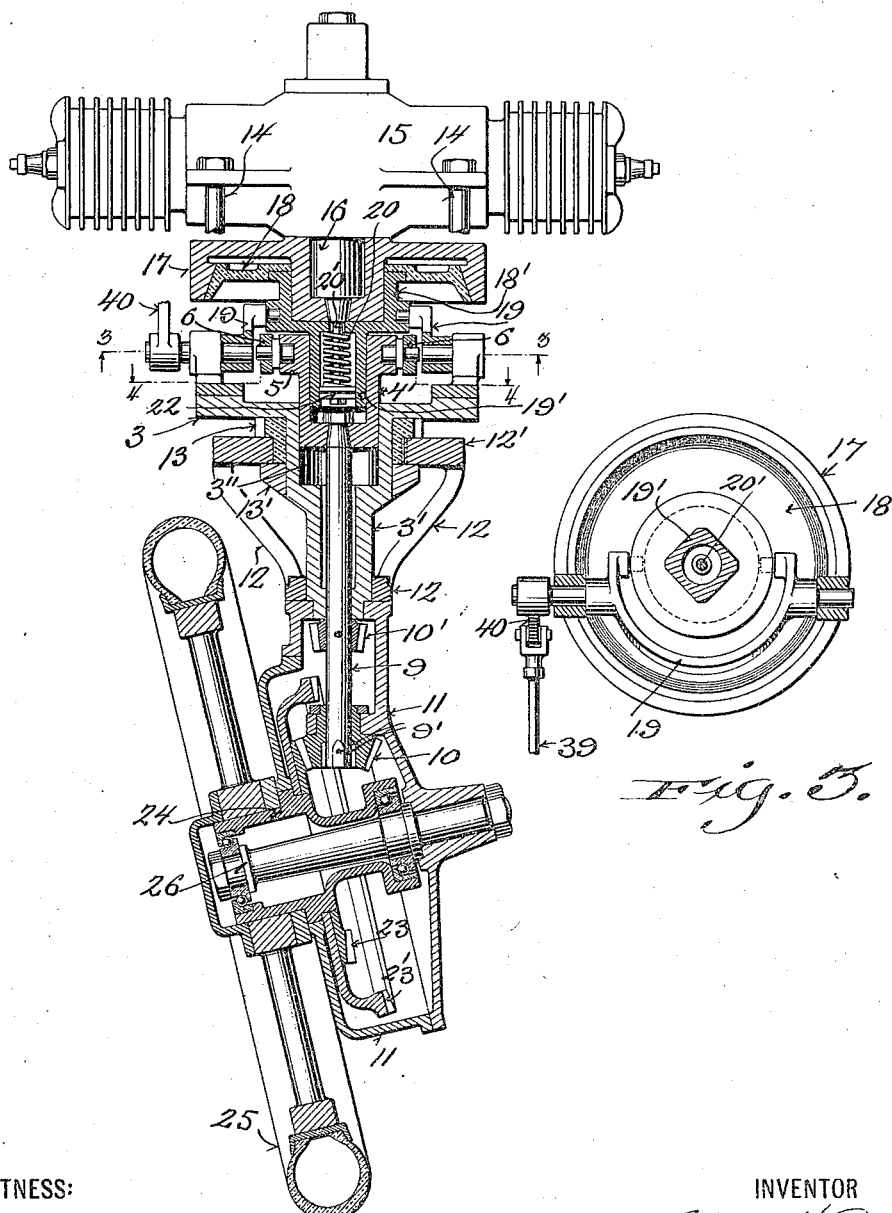

UNITED STATES PATENT OFFICE.

CLARENCE H. PRATT, OF MILWAUKEE, WISCONSIN.

MONOWHEEL DRIVE MECHANISM.

1,310,542.  Specification of Letters Patent.  Patented July 22, 1919.

Application filed August 16, 1918. Serial No. 250,244.

*To all whom it may concern:*

Be it known that I, CLARENCE H. PRATT, a citizen of the United States, and resident of Milwaukee, in the county of Milwaukee and State of Wisconsin, have invented certain new and useful Improvements in Monowheel Drive Mechanism; and I do hereby declare that the following is a full, clear, and exact description thereof.

My invention refers to self-propelled vehicles, and has for its primary object to provide a simple, durable and effective mono-wheel driving mechanism therefor, the same being so constructed and arranged that its associated controlling mechanism is capable of governing the speed of the vehicle, reversing the direction of the travel of the vehicle and stopping the same. All of the mechanism for performing the functions are designed particularly for cheapness in the manufacture.

The specific objects of my invention are:

To provide a power driven jack shaft, which is inclined to the vertical, in gear connection with a driving wheel which is obliquely disposed to said shaft.

To provide means whereby the wheel can be reversed for forward and backward travel.

To provide a variable speed gear associated with a drive wheel and jack shaft, and means for controlling the gear.

To provide a steering mechanism associated with a drive wheel, with an arrangement whereby the said wheel is revolved about the jack shaft axis.

To provide a clutch connection between the jack shaft and an alined engine shaft.

With the above and other objects in view, the invention consists in what is herein shown, described and claimed.

Referring to the drawings, Figure 1 represents a partly sectional elevation of the front portion of a three-wheel motor-driven vehicle, showing my improved mono-drive wheel attached thereto, the section through the drive wheel parts being indicated by line 1—1 of Fig. 5.

Fig. 2 represents a detailed sectional view of the wheel looking toward the rear of the vehicle, the section being indicated by line 2—2 of Fig. 1.

Fig. 3 is a plan sectional view of the same, the section being indicated by the line 3—3 of Fig. 2, the arrows indicating the direction in which the section is taken.

Fig. 4 is another detailed plan view as indicated by line 4—4 of Fig. 2, the same illustrating the steering mechanism and means associated therewith for shifting the driving gear whereby the speed of the driving wheel is regulated, and Fig. 5 is a front view of the vehicle showing the relative position of the mono-drive wheel and the rear wheels of the vehicle.

While I have shown the mono-drive wheel associated with the three-wheel type of vehicle, it is manifest that it can be utilized in connection with a motor-cycle or other vehicle.

Referring by characters to the drawings, 1 represents the angle iron frame members of a vehicle, which frame members are cross connected by beams 2, 2 at the front of the vehicle. Secured to the frame members 2, 2 is a bed plate 3 formed with a depending journal 3', the upper portion of the journal being chambered at 3'' for the reception of a hub member 4' of a groove collar 5. The groove of said collar is adapted to receive a spanner 6, which spanner is secured to a rod 7 that is journaled in the ears of a bracket 8, the same being secured to the frame members 2 and said plate 3 as best shown in Figs. 1 and 4. The hub 4' has secured thereto a jack shaft 9 and its lower end is formed with clutch ribs 9' that engage corresponding recesses in a beveled pinion 10, the jack shaft being adapted to move axially whereby its clutch end will disengage said pinion. The pinion 10 is revolubly mounted in an ear of a housing 11, which housing has a bearing upon the lower end of the journal 3'. The housing is carried by a skeleton leg 12 which terminates at its upper end in the form of a ring 12' and the ring in turn is secured to the hub of a toothed wheel 13, and it is also loosely mounted upon the fixed journal 3' of the bed plate.

Thus it will be seen that the housing and its associated leg are adapted to revolve about the fixed journal 3' and these parts are held against endwise movement by a collar 13' which is threaded or otherwise secured to the journal 3' and is adapted to engage the under face of the ring, it being understood that movement of the housing in the opposite direction is limited by the upper face of the gear wheel 13 being in contact with the bed plate 3.

The bed plate 3 carries a plurality of anchor posts 14 for the support of an opposed cylinder gas engine 15 of the internal combustion type which forms no part of my invention.

As best shown in Fig. 2 the end of the crank shaft 16 has secured thereto a flywheel 17 which is internally beveled to form one member of a friction clutch. The other member 18 of the friction clutch is provided with a hub 18' which is superimposed upon the hub of the fly-wheel and is provided with an annular groove adapted to receive a spanner 19.

The hub of the clutch member 18 has a reduced hollow extension 19', the outer surface of which is squared, as best shown in Fig. 3. The clutch hub extension is in telescopic union with the hub 4' of the collar 5, which latter hub is recessed to conform to the outer surface of the hub extension 19', whereby a driving engagement between these hub members is effected, while at the same time the telescopic hub members are adapted to have relative axial movement to permit control of the clutch and also play of the jack shaft, whereby a selective gear drive for the traction wheel can be effected. The clutch member 18 is held in frictional contact with its companion member by a coil spring 20, which spring surrounds a stem 20' that projects from the end of the crank shaft 16, said spring being interposed between the bottom of the hollow hub 19' and washers 22 that are suitably affixed to the end of the stem.

As best shown in Fig. 2, the jack shaft also carries a beveled pinion 10' which is rigidly secured thereto and is of less diameter than the first mentioned beveled pinion 10. As shown in the drawing referred to, the beveled pinion 10 engages a beveled toothed gear wheel 23 which is in effect a part of the hub 24 of the drive wheel 25, and said hub 24 also carries a larger beveled wheel 23', which beveled wheel is adapted to engage the beveled pinion 10', when the latter is moved downwardly with the jack shaft.

It will be seen that in Fig. 2 the drive wheel 25 will be propelled at maximum speed, and should it be desired, for a hill climb or other purpose, to change to a lower speed, the jack shaft 9 can readily be moved downward, so that its clutching ribs 9' will disengage the pinion 10; and following this disengagement, the pinion 10' will be caused to mesh with the larger beveled wheel 23'.

It will be observed that the housing 11 carries a horizontally disposed and somewhat oblique axle 26 for the reception of the wheel hub 24, and the angle of this axle is such that the tread of the wheel 25, at its line of ground contact, will intersect an imaginary axial line drawn through the jack shaft. This is an important feature of my invention, due to the fact that when it is desired to reverse the direction of travel of the vehicle, no reverse gear is required, but it is only necessary to rotate the housing and its connections approximately one half of a turn, whereby the tread point of the drive wheel will revolve about the axis of the jack shaft to shift its position from the left, as shown in Fig. 2, to a corresponding position to the right, whereby a reversal of drive is instantly effected.

It will also be observed that the housing is preferably constructed to inclose the gears and all working parts associated with the drive wheel, so that proper lubrication can be effected, while at the same time dust and mud are eliminated from these parts, so as to insure proper functioning of them.

Referring more particularly to Figs. 1 and 4, the gear shift collar 5 and associated spanner 6 are manipulated by a rod 27 which is rotatably mounted within the tubular steering stem 28. This rod at the stem wheel end is provided with a manipulating lever 27' whereby the said rod is rocked back and forth, it being so continuously positioned with relation to the steering wheel, so that the rider will have perfect control at one point. The tubular steering stem 28 is mounted in suitable bearings with which the frame is provided, and the lower end of the rod 27 carries a crank plate 29 having a wrist pin which is connected to a lever 30 by a link 30'; the lever being secured to the spanner controlling rock shaft 7. The crank plate 29 is also provided with notches 29' that engage a spring dog 31, whereby said plate is held in selective adjusted position, so that either the high or low speed gears are maintained in their proper driving relations.

The steering stem 28 carries a toothed beveled wheel 32 at its lower end which meshes with a toothed beveled pinion 32', the same being secured to a spindle 33, which spindle has bearings in the bracket 8, and a supplementary bracket 8' that is fastened to one of the frame members 2. The spindle 33 carries a worm 34 which is meshed with a worm wheel 34', and this worm wheel is fastened to the hub of a toothed wheel 35 that meshes with the steering and reversing toothed wheel 13, as best shown in Fig. 1.

The hub of the toothed wheel 35 is loosely mounted upon a stud 36, that is carried by the bracket 8, the said wheel hub being also journaled in an aperture formed in the bed plate 3 as shown. By this gear connection from the steering wheel it will be observed that movement of the stem 28 will impart movement to the train of gears associated therewith, whereby the wheel 13 will be caused to rotate in a selective position to guide the vehicle, due to the fact that said wheel 13 is secured to the housing through the leg 12; and as previously stated, should it be desired to reverse the direction of travel of the vehicle, the drive wheel 25 is given a half turn by suitably manipulating the steering wheel.

It will also be observed, by referring to Fig. 1, that the point of ground contact of the driving wheel is rearward of an imaginary line intersecting the axes of the jack shaft and the wheel axle, whereby the driving wheel has a dragging or caster effect so as to prevent wabble and insure proper alinement and stability in its action. It is manifest that by the driving gear connections, previously described, the jack shaft can be moved to a certain predetermined neutral point, whereby power from the engine will be entirely disconnected from the drive wheel when the machine is to be stopped while the engine is in motion.

In order to control the brakes of the vehicles, which are of ordinary construction, mounted upon the rear axle, I provide a runner 37 that is connected to the brake mechanism and is trained forwardly over a pulley 37' and up to one branch of a three-arm lever 38. Another of said branches of this lever is connected by a link 39 to an arm 40 that is secured to one of the trunnions of the spanner 19. The other arm 38' of the lever terminates with a pedal whereby the said lever can be manipulated by the driver.

Hence it will be seen that by pressing down the foot lever arm 38', it will simultaneously cause the movement of the spanner 19 to release the clutch connection between the engine and jack shaft, and also cause an upward movement of the runner 37, whereby the rear brakes (not shown) will be set. This mechanism, however, does not form an important feature of my invention, in so far as it shows mechanism for breaking the connection between the jack shaft and engine.

While I have shown the mono-drive wheel arranged forwardly of the vehicle, it is possible, under certain conditions, to reverse this position to the rear and accomplish the same general results.

I claim:

1. A mono-drive wheel for vehicles comprising a drive shaft, a jack shaft, a clutch controlled connection with the drive shaft, a fixed journal for the jack shaft, a housing revolubly mounted about the jack shaft, a driving wheel journally supported by the housing, a driving gear connection between the jack shaft and driving wheel, and means for swiveling the housing.

2. A mono-drive wheel for vehicles comprising a drive shaft, a jack shaft, a clutch controlled connection with the drive shaft, a fixed journal for the jack shaft, a housing revolubly mounted about the jack shaft, a driving wheel journally supported by the housing, the driving wheel being obliquely disposed relatively to the jack shaft, whereby the ground plane of the wheel contact approximately intersects the axis of said shaft, a driving gear connection between the jack shaft and driving wheel, and means for swiveling the housing.

3. A mono-drive wheel for vehicles comprising a drive shaft, a jack shaft, a clutch controlled connection with the drive shaft, a fixed journal for the jack shaft, a housing revolubly mounted about the jack shaft, a driving wheel journally supported by the housing, the driving wheel being obliquely disposed relatively to the jack shaft, whereby the ground contact plane of the wheel approximately intersects the axis of said shaft, a driving gear connection between the jack shaft and driving wheel, and manually controlled means for swiveling the housing to effect a steering operation or a reversal of direction of the drive.

4. A mono-drive wheel for self-propelled vehicles comprising a drive shaft, a jack shaft alined therewith, a telescopic clutch connection between the drive shaft and jack shaft, a fixed journal for the jack shaft, a housing revolubly mounted about the fixed journal, an obliquely disposed axle carried by the housing, a drive wheel mounted upon the axle, a selective gear conection between the drive wheel and jack shaft, means for axially moving the jack shaft, whereby the selective gears are controlled, and means for revolving the housing about the fixed journal, whereby the position of the drive wheel is changed to reverse the direction of travel of the vehicle or to steer the same.

5. In a motor-driven vehicle having an engine fixed to its frame, and a journal bearing in axial alinement with the engine shaft; the combination of a jack shaft revolubly mounted in the journal, a clutch connection between the jack shaft and engine shaft, a housing revolubly mounted upon said journal, a drive wheel mounted upon the housing, a selective gear connection between the drive wheel and jack shaft, a hollow steering stem, a toothed gear revoluble with the housing, a train of gears connecting the housing gear and steering stem, an oscillatory rod extending through the steering stem, and means connecting the rod and jack shaft, whereby it is moved endwise to effect selective engagement of the jack shaft driving gears.

In testimony that I claim the foregoing I have hereunto set my hand at Milwaukee, in the county of Milwaukee and State of Wisconsin.

CLARENCE L. PRATT.